United States Patent [19]

Peters

[11] Patent Number: 4,645,424
[45] Date of Patent: Feb. 24, 1987

[54] ROTATING SEAL FOR GAS TURBINE ENGINE

[75] Inventor: Gary P. Peters, Glastonbury, Conn.

[73] Assignee: United Technologies Corporation, Hartford, Conn.

[21] Appl. No.: 633,723

[22] Filed: Jul. 23, 1984

[51] Int. Cl.⁴ .......................... F01D 5/06; F01D 11/02
[52] U.S. Cl. .................................. 416/198 A; 416/95; 416/174; 415/172 A
[58] Field of Search .................. 416/95, 193 A, 198 A, 416/200 A, 201 R, 220 R, 221, 174 A, 174 R; 415/172 A, 199.5

[56] References Cited

U.S. PATENT DOCUMENTS

| | | | |
|---|---|---|---|
| 2,656,147 | 10/1953 | Brownhill et al. | 416/95 X |
| 3,094,309 | 6/1963 | Hull et al. | 416/198 A X |
| 3,295,825 | 1/1967 | Hall | 416/193 A |
| 3,551,068 | 12/1970 | Scalzo et al. | 415/115 X |
| 3,842,595 | 10/1974 | Smith et al. | 416/95 X |
| 3,868,197 | 2/1975 | Hugoson | 416/201 X |
| 3,894,324 | 7/1975 | Holzapfel et al. | 416/201 R X |
| 4,127,359 | 11/1978 | Stephan | 416/201 R X |
| 4,192,633 | 3/1980 | Herzner | 416/193 A X |
| 4,470,757 | 9/1984 | Vollinger | 416/193 A X |

FOREIGN PATENT DOCUMENTS

| | | | |
|---|---|---|---|
| 610314 | 10/1948 | United Kingdom | 416/198 A |
| 790029 | 1/1958 | United Kingdom | 416/201 R |
| 988541 | 4/1965 | United Kingdom | 416/95 |

Primary Examiner—Everette A. Powell, Jr.
Attorney, Agent, or Firm—Norman Friedland

[57] ABSTRACT

The cavity between the first stage and second stage turbines of a gas turbine power plant is sealed by a rotating seal characterized by an I-beam section annular member spanning therebetween to transmit the axial load through the upper rim and the radial load through the lower rim of the annular member. A hammer head eccentrically mounted on the edge of the upper rim locks in the first stage rear side plate and a gap between the lower rim and second stage turbine pressure balances the I-section.

4 Claims, 2 Drawing Figures

ROTATING SEAL FOR GAS TURBINE ENGINE

CROSS REFERENCE

This invention is related to the inventions disclosed in copending patent applications entitled TURBINE SIDE PLATE ASSEMBLY, TURBINE COVER-SEAL ASSEMBLY and BREACH LOCK ANTI-ROTATION KEY, filed by Robert R. Kalogeros, Robert R. Kalogeros and Gary F. Chaplin, and Robert R. Kalogeros, respectively on even date and all assigned to the same assignee of this application.

TECHNICAL FIELD

This invention relates to seals and particularly to the type that seals the inner cavity between the 1st stage turbine and 2nd stage turbine of a gas turbine engine.

BACKGROUND ART

This invention constitutes an improvement over the lenticular seal disclosed and claimed in U.S. Pat. No. 3,733,146 granted to S. L. Smith & P. E. Voyer on May 15, 1973 and assigned to the same assignee as this patent application. This patent discloses a toroidally shaped seal disposed between the 1st and 2nd turbine and is lenticular in cross section. Essentially, the inner and outer curved plates form an elliptical body that has its narrow ends abut against the adjacent disks of the turbines or the side plates thereof. This, in fact, forms a point attachment in cross section, and a circumferential edge attachment in full, being supported radially by the turbine disks and transmitting the axial load through both curved plates. In operation, the plates achieved their results, that is, net reduced stress, by virtue of the bending of the plates. Obviously, the higher the bending loads the heavier the plates have to be so as to tolerate the higher bending stresses. Other patents that disclose seals or spacers between turbine disks are U.S. Pat. Nos. 3,094,309, 3,894,324 and 4,127,359.

I have found that I can achieve the sealing capabilities of the lenticular seal yet provide a lighter weight structure that affords additional features not heretofore attainable with the lenticular seal. According to this invention, the seal on the outer diameter has a rim element that has a virtually flat annular surface and on the inner diameter has a rim element that has a convexed annular surface and both rims are attached by a vertical disk much like an "I" beam in cross section. The outer rim is concentric to the centerline and transmits the axial loads. Because of this configuration the outer rim provides a stiffer backbone to the axial stresses exerted by the turbine disks and serves to tune the vibrations of the 2nd turbine. The inner rim abuts against a projection extending axially from the adjacent turbine disks and may be slightly conical in shape convexing toward the centerline. This member transmits the radial load and it, itself, takes some of the radial load by transmitting some of the load to the outer rim through the transverse member, thus minimizing the radial stress placed on the turbine disks. Lugs on the inner rim cooperate with lugs on the turbine disks to prevent rotation of the seal in the event of slippage. The lugs of the inner rim cooperate with the disk of the second stage turbine to assure that the pressure drop across the transverse member doesn't exceed a predetermined value. Further, the seal may include a vertical projection member (hammer head) adjacent the rear side plate of the first turbine to exert a load upon rotation to retain it in place.

DISCLOSURE OF INVENTION

An object of this invention is to provide for a gas turbine engine an improved rotating seal for the cavity between the 1st and 2nd turbines. A feature of this invention is to provide an annular seal member that is I-beam shaped in cross section. The outer diameter rim is virtually concentric to the central axis of the engine and has a flat upper surface extending between the disks of the turbine to transmit the axial loads. The inner diameter rim abuts radially against projections on the disks to take up the radial loads. The I section also transmits some of the radial load thus alleviating the full radial loads on the disks.

Another feature of this invention is that the seal member also serves to secure components of this turbine assembly. A still further feature of this invention is provisions to admit pressure behind the I section of the I-beam to balance the pressure acting on the opposite face.

Another feature of this invention is to provide a hammer head extending radially outward from the outer diameter of the seal to support the rear side plate of the 1st turbine.

Other features and advantages will be apparent from the specification and claims and from the accompanying drawings which illustrate an embodiment of the invention.

BEST MODE FOR CARRYING OUT THE INVENTION

Figure 1:
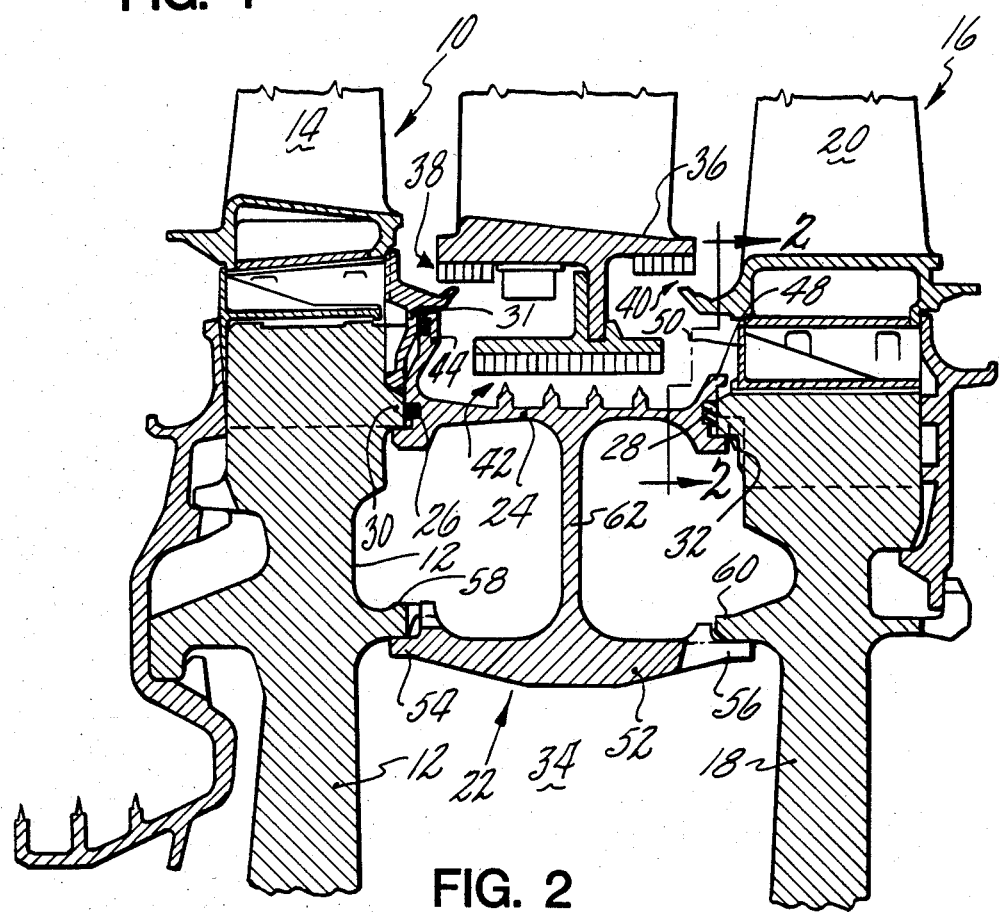
FIG. 1 is a partial view partly in section and partly in elevation showing the 1st and 2nd turbine stages of a gas turbine engine employing the invention and FIG. 2 is a partial view in elevation taken along line 2—2 OF FIG. 1 showing the inner face of the 2nd turbine stage.
Figure 2:
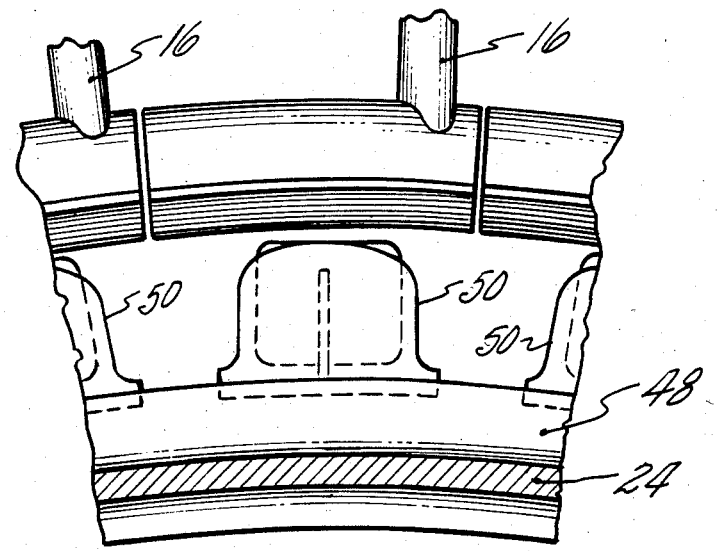

This invention is particularly suitable as the inner cavity seal for the 1st and 2nd turbine stages of a gas turbine power plant such as the engine models JT-9D and PW2037 manufactured by Pratt & Whitney Aircraft of United Technologies Corporation, the assignee of this patent application, the details of which are incorporated herein by reference. As best seen from FIGS. 1 & 2, the first stage turbine generally illustrated by reference numeral 10 comprises a rotor disk 12 and a plurality of circumferentially spaced turbine blades 14 (only a portion being shown) suitably supported thereby. Likewise, the 2nd stage turbine generally illustrated by reference numeral 16 comprises a rotor disk 18 and a plurality of circumferentially spaced blades 20 (only a portion being shown) suitably supported thereby. Although not shown, it will be appreciated that both the 1st and 2nd stage turbines are coupled to a common shaft (not shown) and serve to extract energy from the engine's fluid working medium and transfer said energy in terms of R.P.M. to the engine's shaft.

As noted, the I-Beam (in cross section) seal generally indicated by reference numeral 22 comprises an outer rim 24 spanning between the rear of the disk 12 and the front of disk 18 and is configured so that the general shape is generally concentric to the engine's centerline. Annular 0-type seals 26 and 28 bear against the axial projections 30, 31, and 32 respectfully to minimize leakage from the gas path that is outboard of the seal in the vicinity of the blades 14 and 20.

From the foregoing it is apparent that the rim 24 together with "O" seals 30 and 32 serve to seal the cavity 34 from the engines working fluid medium. Leakage around the blades adjacent the stator 36 are minimized by the labyrinth seals 38, 40 and 42. Similar to the lenticular seal in the U.S. Pat. No. 3,733,146, supra, the knife edges bear against the complimentary lands formed from honeycomb material when in the rotating mold and serve the same sealing function. Labyrinth seals are well known and are not a part of this invention.

According to this invention, a hammer head 44, which extends radially from the outer edge of rim 24 around the circumference is slightly eccentric in shape so as to bear against the rear side plate 46 of the turbine rotor 14. The rim 24 is tightly fitted between turbine disks 12 and 18 and in addition to the other features to be elaborated on hereinbelow together with the hammer head 44 secured several of the component parts of the turbine stages. The hammer head bears against the rear side plate 46 which is annular in shape and is held into place for additional sealing "O" seal 45 may be used in hammer head 44 thereby. Because of the eccentricity of the hammer head, the centrifugal loads upon rotation drive the hammer head axially rearwardly (as viewed by the direction of the engine's working medium) forcing it into the side plate 46 when the first stage turbine is fully loaded. Likewise a forward projection 48 abuts against the mail boxes 50 that are relatively loosely mounted in the gap between the turbine disk 18 and the root of turbine blade 20. The mail boxes per se are well known in gas turbine engines but its retention as described herein is significantly different from heretofore designs. Heretofore side plates and mail boxes were held into place by other means, such as rivets, welds and the like. This invention avoids the use of such means so as to reduce the total number of engine components.

As noted above, the upper rim 24 not only serves to support the knife edges of the labyrinth seal it provides axial stiffness to the 2nd stage turbine so as to tune it for the vibrating field to which it is subjected.

The inner rim 52 is slightly coned to form a convexed surface, the outer edges 54 and 56 underlie axial projections 58 and 60 and are snapped into place upon assembly. A flat plate or disk 62 support the inner rim and outer rim and in cross section resemble an "I" Beam. The rim 52 serves to take up the radial loads passing some of the radial stresses through the disks via the axial projections 58 and 60 and some through the flat plate 62. The flat plate 62 by virtue of this construction serves to minimize or control the growth of the knife edges on the outer rim 24.

The radial restraints 54 and 56 also serve to control the average tangential stress in the seal 22 for burst considerations and control local tangential stress for low cycle fatigue considerations.

The dimensions between the axial projection 60 on turbine disk 18 and the restraint 56 is selected to allow a leakage path from cavity 34 into the cavity between flat plate 62 and turbine disk 18 so as to balance the pressure across the flat plate 62. Obviously, because the cavity between plate 62 and the first turbine is in proximity to the first turbine where the pressure is highest, it tends to see a higher pressure than that which is on the opposing side. The gap provided adjacent restraint 56 tends to bleed pressure therein so as to balance these forces. While not preferred, this pressure differential could be alleviated further by locating holes within flat plate 62 itself.

Antirotation lugs 70 formed on disks 12 and 72 formed on rim 52 cooperate to prevent relative rotation to the turbine disks and seal in the event of a malfunction. The lenticular seal described in U.S. Pat. No. 4,332,133 supra contained a similar function.

It should be understood that the invention is not limited to the particular embodiments shown and described herein, but that various changes and modifications may be made without departing from the spirit and scope of this novel concept as defined by the following claims.

I claim:

1. For a gas turbine power plant comprising a first stage turbine having a first disk supporting a plurality of turbine blades and having a first axial projection, a second stage turbine having a second disk supporting a plurality of turbine blades and having a second axial projection, rotating sealing means for the cavity between said first disk and said second disk sealing against the working fluid of said turbines including an annular member having an I-beam shape in cross-section and an upper flat contoured rim extending between and abutting said first disk and said second disk for transmitting the axial loads imposed by said turbine blades, and a lower convexed, contoured rim extending between said first disk and said second disk, the outer edges of said lower convexed, contoured rim radially abutting the respective first axial projection and the second axial projection for transmitting the radial loads imposed by said turbine blades whereby a portion of the radial load is transmitted through said first disk and said second disk and the remaining portion is transmitted through the I-section of said I-beam shaped annular member.

2. For a gas turbine power plant as claimed in claim 1 including ring seal elements in annular grooves formed in opposing side surfaces of said upper flat contoured rim bearing against the opposite side forces of the respective first disk and second disk.

3. For a gas turbine power plant as in claim 2 wherein said first disk at the juncture supporting said turbine blades includes recess, an annular side plate abutting the face of said first disk at said recess, a hammer head contiguous to projecting radially outward at one edge of said upper flat contoured rim but slightly eccentric at its outer edge abutting axially, said side plate to retain said side plate in position and the eccentricity causing said hammer head to exert a load on said side plate when said rotating seal is in the rotating mode.

4. For a gas turbine power plant as in claim 3 wherein the outer edge of said lower convexed contoured rim includes a space between said second axial projection and said edge to permit fluid in said cavity to pressurize the side face of said I-section.

* * * * *